(12) United States Patent
Huang

(10) Patent No.: US 6,824,422 B2
(45) Date of Patent: Nov. 30, 2004

(54) EXPANDABLE CONNECTING HUB ASSEMBLY

(76) Inventor: Yea Yen Huang, No. 12, Alley 70, Sec. 1, Chung Hua Road, Tocheng City, Taipei Hsien (TW)

( * ) Notice: Subject to any disclaimer, the term of this patent is extended or adjusted under 35 U.S.C. 154(b) by 0 days.

(21) Appl. No.: 10/314,150

(22) Filed: Dec. 9, 2002

(65) Prior Publication Data

US 2004/0110415 A1 Jun. 10, 2004

(51) Int. Cl.[7] ............................................. H01R 13/60
(52) U.S. Cl. ..................................................... 439/535
(58) Field of Search ............................... 439/535, 683, 439/686, 756, 681, 690; 361/686, 683; 493/683, 686, 756, 681, 690

(56) References Cited

U.S. PATENT DOCUMENTS

| | | | | |
|---|---|---|---|---|
| 5,187,645 | A | * | 2/1993 | Spalding et al. ............ 361/686 |
| 6,478,610 | B1 | * | 11/2002 | Zhou et al. .................. 439/490 |
| 2002/0186317 | A1 | * | 12/2002 | Kayanuma ................... 348/373 |
| 2003/0117521 | A1 | * | 6/2003 | Nagaoka ...................... 348/373 |

OTHER PUBLICATIONS http://web.archive.org/web/20001122020900/catalog.belkin.com/IWCatSectionView.process?IWAction=Load&Merchant_Id=1&Section_Id=35.* http://web.archive.org/web/20011119033645/www.newpoint.com/show_usb.htm?usb=uh1405, http://web.archive.org/web/20000816100056/www.pretec.com/index2/product/Accessory/usb_card_reader.htm.* http://web.archive.org/web/20001110065100/www.sandisk.com/cons/photo.htm.* http://web.archive.org/web/20000901232518/www.ramelectronics.net/html/usb_converters.html.*

* cited by examiner

Primary Examiner—P. Austin Bradley
Assistant Examiner—Phuongchi Nguyen
(74) Attorney, Agent, or Firm—Troxell Law Office PLLC

(57) ABSTRACT

An expandable connecting hub assembly comprises a hub housing including a plurality of connecting ports for receiving plug connector therein. The hub housing further includes a power inlet and a signal input port. A cradle is formed on the hub housing with a plurality of headers thereon. A detachable connecting device is electrically sit on the cradle and includes a plurality of socket pins with respect to the headers. Wherein when the detachable connecting device is sit on the cradle, an electrical connection is made between the hub housing and the connecting device through the headers and the socket pins. The detachable connecting device further includes a cable having a plug connector thereon for electrically connecting with a computer. According to the aspects of the invention, the connecting device is a card reader, or a network connecting device, or a signal converting box.

4 Claims, 5 Drawing Sheets

EXPANDABLE CONNECTING HUB ASSEMBLY

BACKGROUND OF THE INVENTION

1. Field of the Invention

The present invention relates to a connector hub assembly, and more particularly to an expandable connector hub assembly providing a robust usage for customer.

2. Description of the Prior Art

Ever since the computer becomes a necessity of our modern daily life, our daily life has been tremendously changed because of the convenience and efficiency brought by the computer. As such, a great deal of peripheral equipments each features a unique function has been introduced. In addition, as the local area network has become more and more popular, interconnections between peripheral equipments, notebook computers, personal computer (desktop computer), servers become more ad more complicated.

Among the peripheral equipments, printers, scanners, monitors and portable disk drivers have a comparable larger size, while keyboards, mouse, modem, card reader, digital camera, outer box and hub have a comparable smaller size. However, unless each of the above mentioned equipments is electrically connected to the computer, it would not work. Accordingly, how to make such interconnections between the peripheral equipments and the computers and powered them is really an art of work.

The innovation and invention of the Universal Serial Bus (USB), IEEE 1394. and keyboard and mouse (PS2) connectors really improve the interconnection between the computers and the peripheral equipments. Because of the introduction of the above-mentioned connection ports, the peripheral equipments can be readily and easily interconnected to the computer. The customers can easily use those peripheral equipments along with their computers.

The uniqueness and features of the connectors of the USB, IEEE 1394, and PS2 are those connectors generally include totally four conductive wires. Among them, two out of four or four out of six are used for signal transmission, while the rest two conductive wires are used for power transmission. The power transmitted through those two power conductive wires is about 5 voltages and 500 mA. As such, the electrical interconnection between the computer and the peripheral through those connectors can facilitate both signal and power transmission. Furthermore, nowadays, the USB, IEEE 1394, and PS2 connectors have become a standard connector on desktop computer, notebook, and hub. The interconnections between the computers and the peripheral equipments are therefore become more and more convenient and user-friendly.

The most appealing function of the USB, IEEE 1394 connector, PS2 connector is a plurality of computer can be electrically plugged to a hub via the above mentioned connectors. Then the hub can be electrically connected to the host computer. As such, the present invention characterizes the functions provided by those connectors. However, even the peripheral equipments can be connected to the hub, and finally the host computer, those peripheral equipments need to be suitably powered. Accordingly, solving the power supply to the peripheral equipments is also a challenge to the design engineer.

However, the hub used nowadays belongs to stationary type and in which the USB, IEEE 1394, and PS2 are designated to predetermined application. It is unlikely to expand its connecting ports in case there is a need for expansion.

SUNMARY OF THR INVENTION

An object of this invention is to provide a connector hub assembly in which an addition mating port in which a card reader, network connector box ad signal converting box can be connected.

In order to achieve the object set forth, an expandable connecting hub assembly in accordance with the present invention comprises a hub housing including a plurality of connecting ports for receiving plug connector therein. The hub housing further includes a power inlet and a signal input port. A cradle is formed on the hub housing with a plurality of headers thereon. A detachable connecting device is electrically sit on the cradle and includes a plurality of socket pins with respect to the headers. Wherein when the detachable connecting device is sit on the cradle, an electrical connection is made between the hub housing and the connecting device through the headers and the socket pins. The detachable connecting device further includes a cable having a plug connector thereon for electrically connecting with a computer. According to the aspects of the invention, the connecting device is a card reader, or a network connecting device, or a signal converting box.

BRIEF DESCRIPTION OF THR DRAWINGS

DETAILED DESCRIPTION OF PREFERRED EMBODIMENTS

Figure 1:
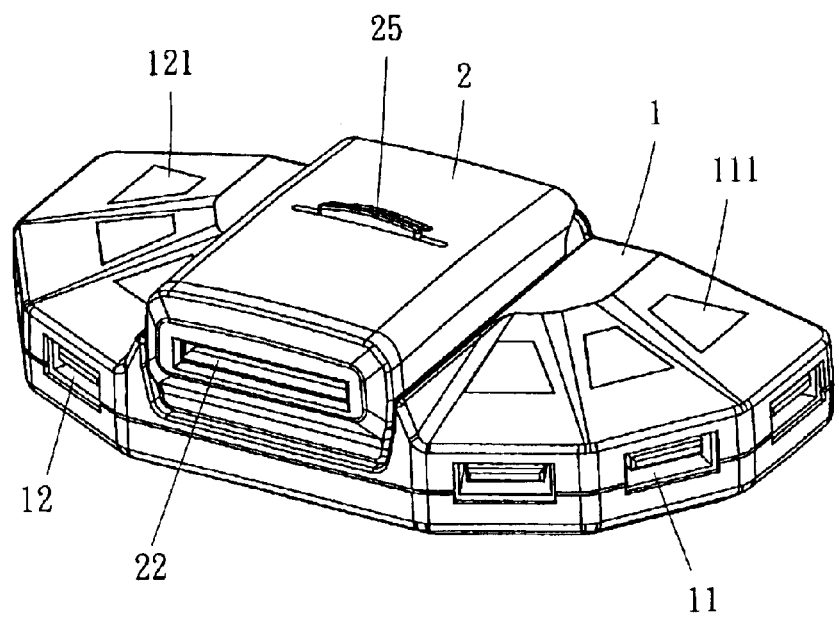
FIG. 1 is a perspective view of an expandable connecting hub assembly in accordance with the present invention with a card reader electrically and detachably mounted thereon.
Figure 2:
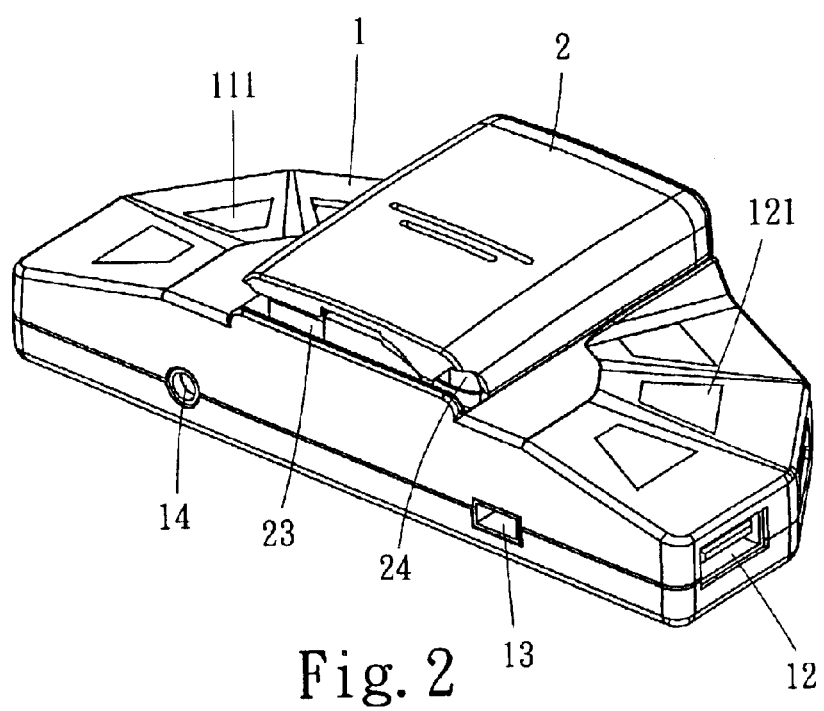
FIG. 2 is a rear view of FIG. 1.
Figure 3:
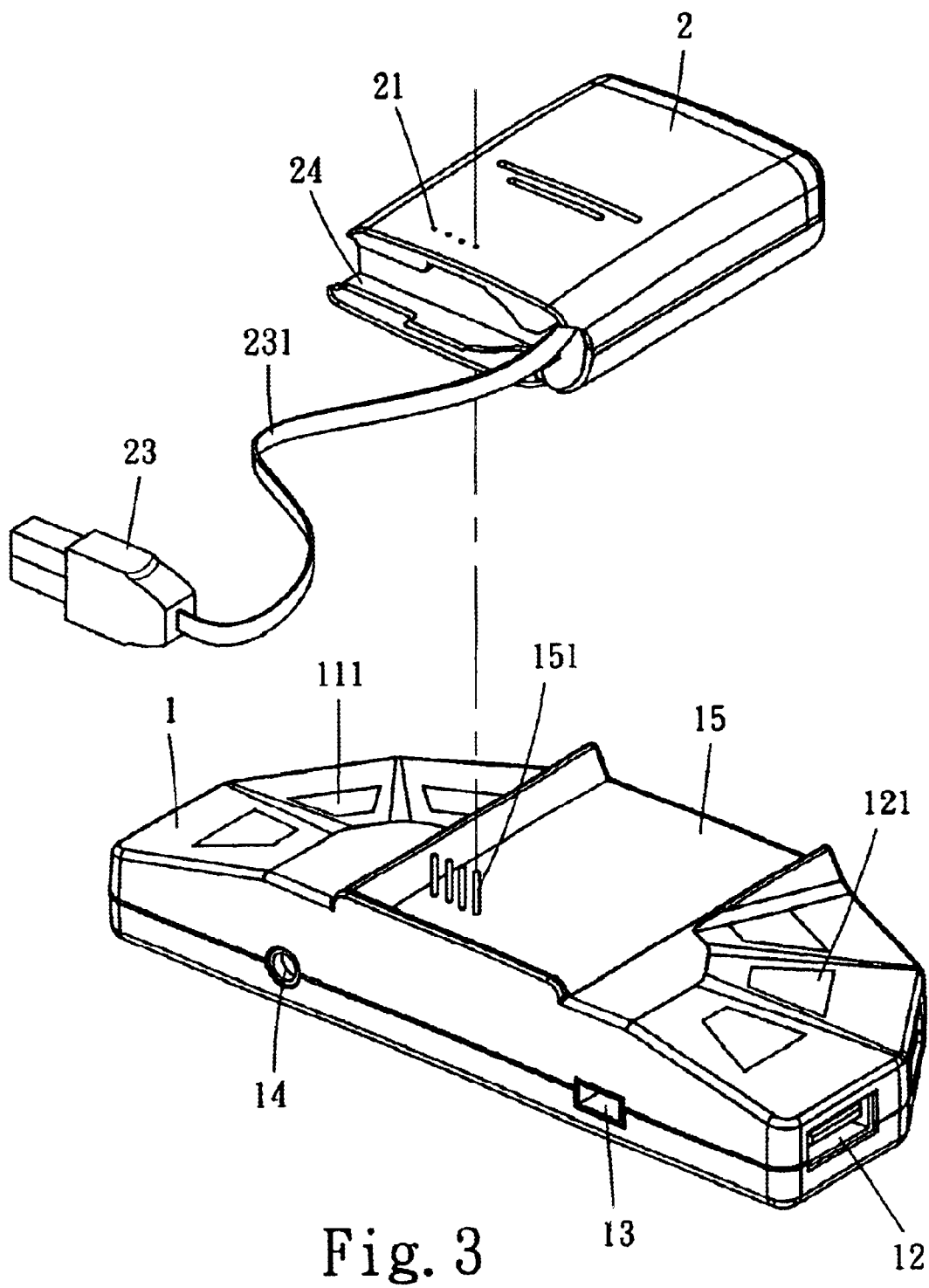
FIG. 3 is similar to FIG. 2 with the card reader detached from the expandable connecting hub assembly.

Referring to FIGS. 1 to 3, an expandable connection hub assembly in accordance with a first embodiment of the present invention comprises a hub 1, a card reader 2, a network connecting box 3, and/or a signal converting box 4, such as shown in FIGS. 7, 8, 9 and 10.

Figure 4:
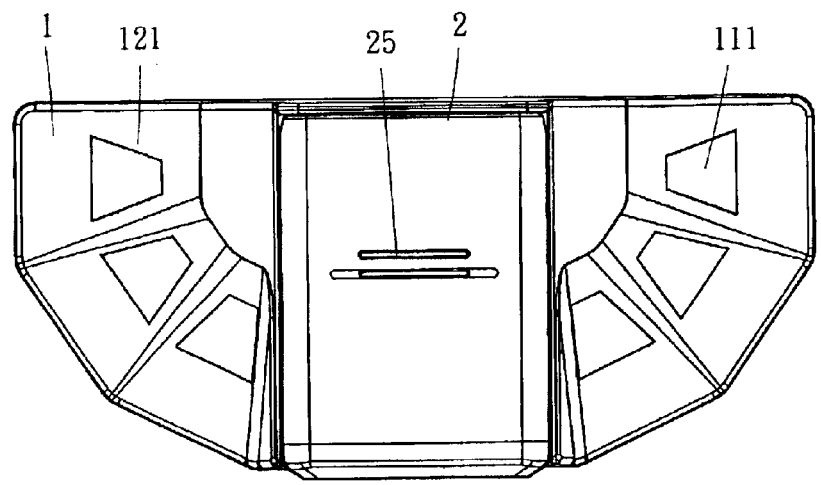
FIG. 4 is a top view of FIG. 1.
Figure 5:
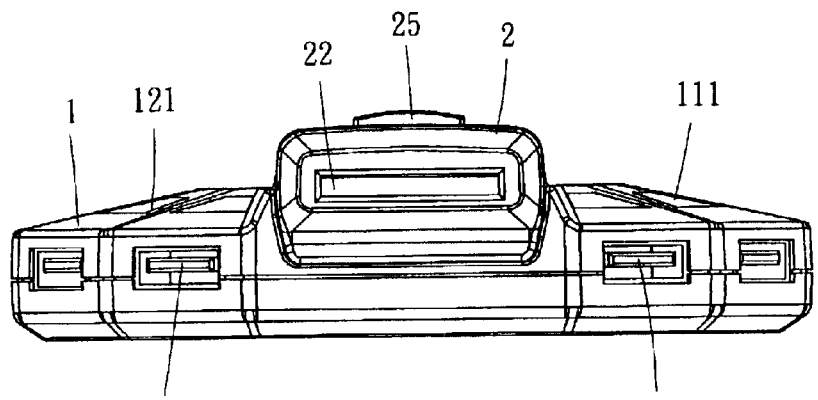
FIG. 5 is a front end view of FIG. 1.
Figure 6:
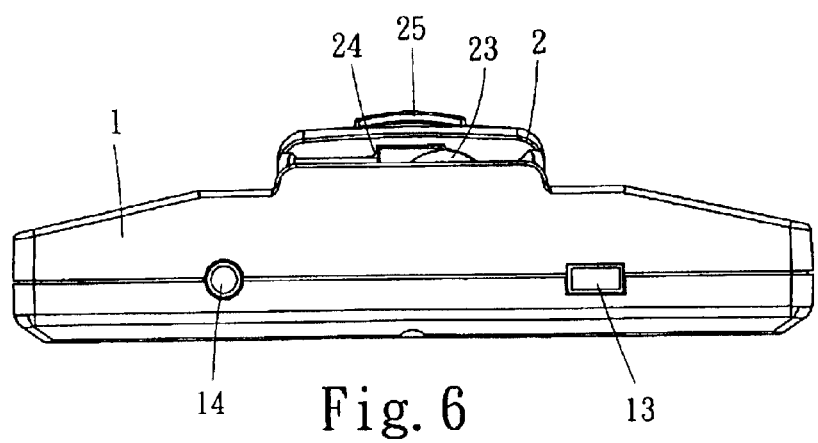
FIG. 6 is a rear end view of FIG. 1.

As clearly shown in FIGS. 4 to 6, the hub 1 generally includes a housing with a plurality of USB, IEEE 1394, or PS2 receptacle ports 11, 12 for receiving plugs of USB, IEEE 1394, and/or PS2 cable assembly. The hub 1 is further provided with an input port 13 and a power inlet 14. Each of the USB, IEEE 1394, and PS2 receptacle ports 11, 12 is provided with LED indicators 111, 121 so as to clearly and positively indicate signal connections have been properly established when the USB, IEEE 1394, PS2 cable assembly is plugged thereto. As indicated above, the USB, IEEE 1394 and PS2 have the capability of providing power supply, accordingly, the peripheral equipments plugged to the hub 1 can be also properly powered.

The hub 1 is further provided with a cradle 15 on which the card reader 2, or the network connecting box 3, and/or a signal converting box 4. The cradle 15 is provided with a plurality of headers 151 for electrically interconnecting with the card reader 2, the network connecting box 3, and the signal converting box 4 when the later is mounted thereon.

Since the connecting port of the card reader 2, the network connecting box 3, and/or the signal converting box 4 have similar outer configuration, accordingly, the present invention will use card reader 2 for description. As shown in FIG. 3, the card reader 2 includes a plurality of socket pins 21 with respect to the headers 151 of the cradle 15 of the hub 1. Accordingly, when the card reader 2 sits on the cradle 15, electrical interconnection will be established between the socket pins 21 and the headers 151. The card reader 2 further includes a cable 231 having a USB plug 23 arranged at an end thereof. The card reader 2 further defines a receiving slot 24 in which the USB plug 23 can be suitably received therein. The card reader 2 is provided with a memory card slot 22 in which a memory card (not shown) can be inserted for storing/retrieving data therein and therefrom.

When the card reader 2 sits on the hub 1, the USB plug 23 of the card reader 2 does not need to be removed for electrical connection with a computer as long as the hub 1 is electrically interconnected with the computer because there is already an interconnection between the socket pins 21 and the headers 151. If the card reader 2 is removed from the hub 1, then the USB plug 23 can be removed from the receiving slot 24 and plugs into any receptacle USB on a computer to be connected thereby providing a user-friendly application. The card reader 2 is provided with indicator 25 indicating data storing/retrieving process is undergoing.

Figure 7:
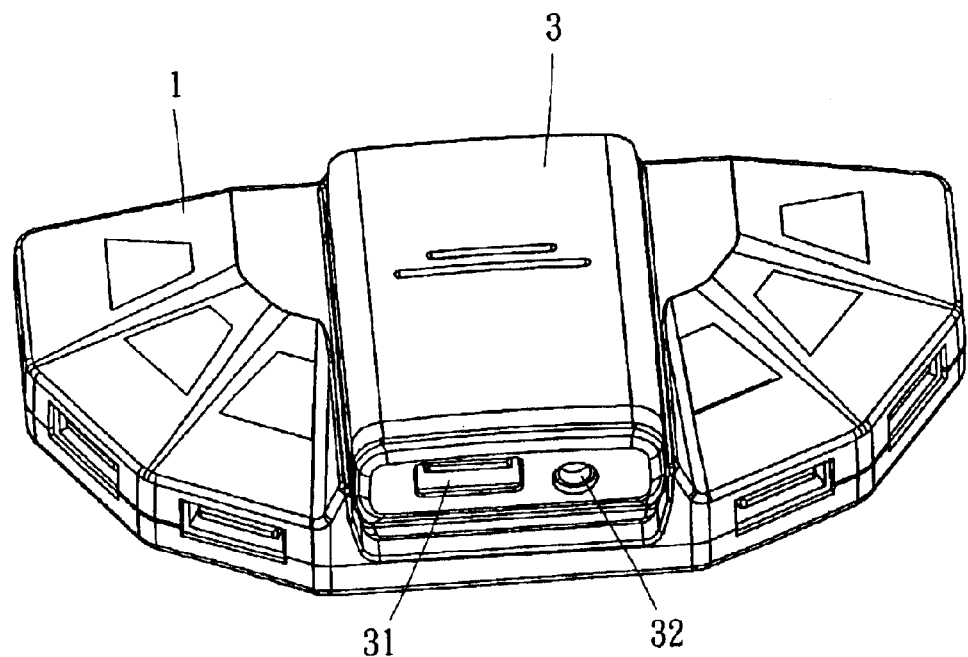
FIG. 7 is a perspective view of an expandable connecting hub assembly in accordance with the present invention with a network connecting box electrically and detachably mounted thereon.
Figure 8:
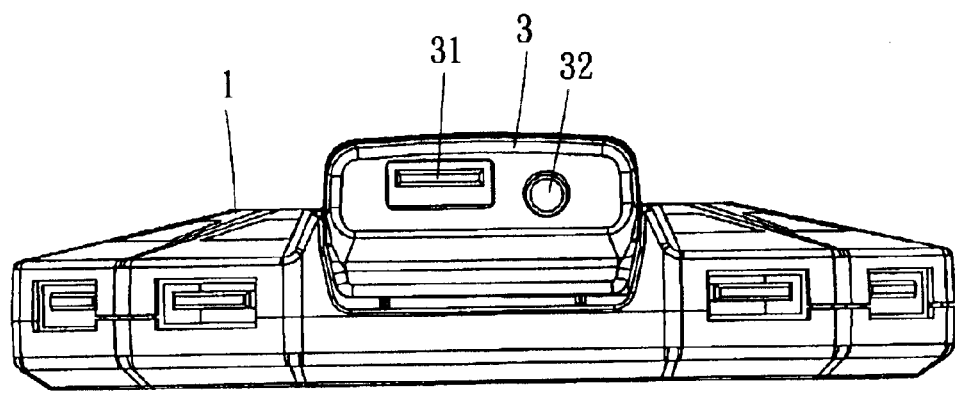
FIG. 8 is a frond end view of FIG. 7.

As shown in FIGS. 7 and 8, the network connecting box 3 can be made with identical outer configuration as the card reader 2 so as to be electrically sit on the cradle 15 of the hub 1 as the card reader 2 does. The network connecting box 3 can be provided with a USB receptacle 31, and a power outlet 32. Accordingly, other equipments having the compatible interface can be electrically connected to the network connecting box 3.

Figure 9:
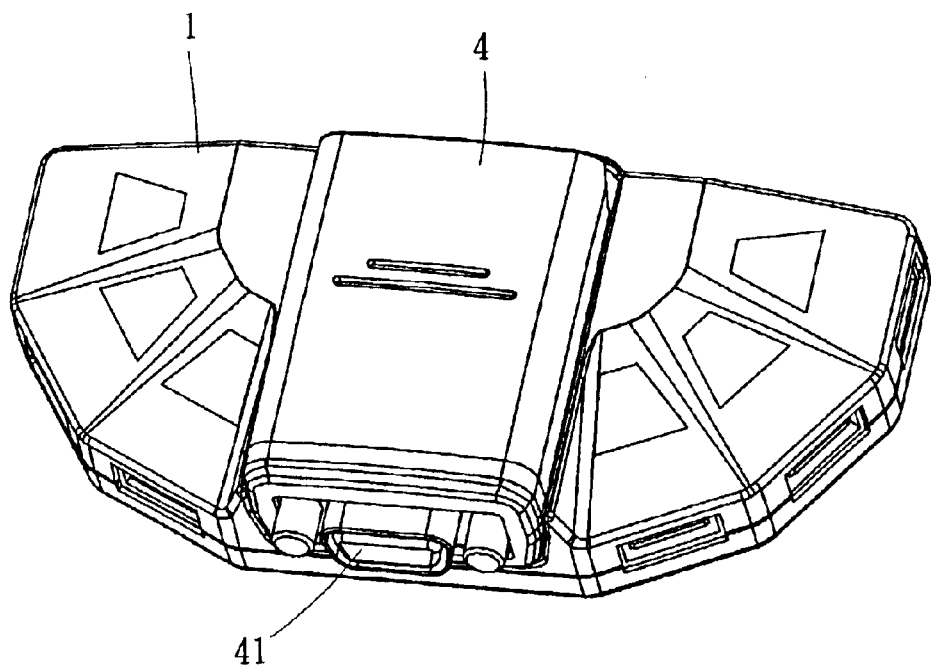
FIG. 9 is a perspective view of an expandable connecting hub assembly in accordance with the present invention with a signal converting box electrically and detachably mounted thereon.
Figure 10:
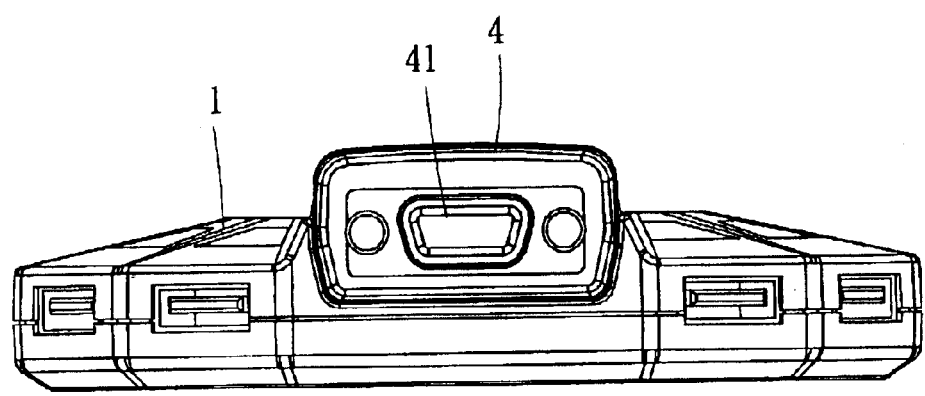
FIG. 10 is a frond end view of FIG. 9.

As shown in FIGS. 9 and 10, the signal converting box 4 is electrically sit on the cradle 15 of the hub 1. The signal converting box 4 has the same outer configuration to the card reader 2. The signal converting box 4 is provided with a connecting port 41, which is generally a D-sub connector. Accordingly, interconnection between different peripheral equipments with respect to a computer can be made through the provision of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An expandable connecting hub assembly comprising:
   a) a hub housing having:
      i) a plurality of connecting ports selected from a group of connecting ports consisting of USB, IEEE 1394 and PS2 interface, each connecting port including an LED indicator, each of the plurality of connecting parts opens through one of a plurality of planar segments defining a front surface of the hub housing;
      ii) a cradle formed on a central portion of the hub housing, the cradle having a plurality of headers, the plurality of connecting parts includes at least three connecting parts located on each of two opposing sides of the cradle;
      iii) a power inlet; and
      iv) a signal inlet port; and
   b) a detachable connecting device having a plurality of socket pins and removably connected to the cradle of the hub housing by inserting the plurality of headers into the plurality of socket pins,
      wherein the signal input port is selected from a group of input ports consisting of USB, IEEE 1394 and PS2 interface.

2. The expandable connecting hub assembly according to claim 1, wherein the connecting device is a card reader having a memory card receiving slot therein for storing and receiving data from an inserted memory card and a cable with a connector.

3. The expandable connecting hub assembly according to claim 1, wherein the connecting device is a network connecting box having a power outlet and a connector selected from the group of connectors consisting of USB, IEEE 1394 and PS2 interface.

4. The expandable connecting hub assembly according to claim 1, wherein the connecting device is a signal converting box having a D-sub connector.

* * * * *